(12) United States Patent
Yonge, III et al.

(10) Patent No.: US 7,684,568 B2
(45) Date of Patent: Mar. 23, 2010

(54) ENCRYPTING DATA IN A COMMUNICATION NETWORK

(75) Inventors: Lawrence W. Yonge, III, Ocala, FL (US); Srinivas Katar, Ocala, FL (US)

(73) Assignee: Intellon Corporation, Ocala, FL (US)

(*) Notice: Subject to any disclaimer, the term of this patent is extended or adjusted under 35 U.S.C. 154(b) by 304 days.

(21) Appl. No.: 11/472,804

(22) Filed: Jun. 22, 2006

(65) Prior Publication Data
US 2007/0112972 A1 May 17, 2007

Related U.S. Application Data

(63) Continuation-in-part of application No. 10/720,742, filed on Nov. 24, 2003.

(60) Provisional application No. 60/702,717, filed on Jul. 27, 2005, provisional application No. 60/705,720, filed on Aug. 2, 2005.

(51) Int. Cl.
H04L 9/00 (2006.01)
(52) U.S. Cl. .................................................. 380/262
(58) Field of Classification Search ................ 713/162; 380/262
See application file for complete search history.

(56) References Cited

U.S. PATENT DOCUMENTS

| | | | | |
|---|---|---|---|---|
| 6,028,933 A * | 2/2000 | Heer et al. | ................... | 713/169 |
| 6,055,316 A * | 4/2000 | Perlman et al. | .............. | 380/262 |
| 6,074,086 A | 6/2000 | Yonge, III | | |
| 6,111,919 A | 8/2000 | Yonge, III | | |
| 6,269,132 B1 | 7/2001 | Yonge, III | | |
| 6,278,685 B1 | 8/2001 | Yonge, III | | |
| 7,274,792 B2 * | 9/2007 | Chin et al. | ................... | 380/262 |
| 2002/0131591 A1 | 9/2002 | Henson et al. | | |
| 2003/0133427 A1 * | 7/2003 | Cimini et al. | ............... | 370/338 |
| 2004/0010736 A1 * | 1/2004 | Alapuranen | ................. | 714/100 |
| 2004/0083362 A1 * | 4/2004 | Park et al. | .................... | 713/162 |
| 2004/0141523 A1 * | 7/2004 | Bhushan et al. | ............. | 370/469 |
| 2004/0186994 A1 * | 9/2004 | Herbert et al. | .............. | 713/164 |
| 2005/0190785 A1 | 9/2005 | Yonge, III et al. | | |

OTHER PUBLICATIONS

Anuj Batra et al., TI Physical Layer Proposal for IEEE 802.15 Task Group 3A, May 14, 2003, IEEE, IEEE 802.15-03/142R2, pp. 1-76.*
PCT International Search Report and Written Opinion dated Jun. 23, 2008. International Application No. PCT/US06/29213, 10 pages.
'Initialization Vector' Wikipedia, the Free Encyclopedia [online] [retrieved on Jun. 21, 2006] <URL: http://en.wikipedia.org/wiki/Initialization_vector>.

* cited by examiner

*Primary Examiner*—Nathan Flynn
*Assistant Examiner*—Chirag R Patel
(74) *Attorney, Agent, or Firm*—Fish & Richardson P.C.

(57) ABSTRACT

A method for communicating in a network is presented. The method includes encapsulating content from a plurality of high level data units from a high level layer to generate a stream; dividing the stream into a plurality of segments; individually encrypting at least some of the segments, wherein an encrypted segment includes a plurality of encrypted blocks, and at least some of the encrypted blocks are encrypted based on at least one other encrypted block within the encrypted segment; and supplying low level data units to a physical layer that handles physical communication over the network, at least some of the low level data units each including a plurality of encrypted segments.

21 Claims, 4 Drawing Sheets

ENCRYPTING DATA IN A COMMUNICATION NETWORK

CROSS-REFERENCE TO RELATED APPLICATIONS

This application is a continuation-in-part application of and claims priority to U.S. application Ser. No. 10/720,742, filed on Nov. 24, 2003, and this application claims the benefit of U.S. Application No. 60/702,717, filed on Jul. 27, 2005, and U.S. application Ser. No. 60/705,720, filed on Aug. 2, 2005, and each of the preceding applications is incorporated herein by reference.

TECHNICAL FIELD

The invention relates to network protocols, and more particularly to encrypting data in a communication network.

BACKGROUND

Encryption is used in communication networks to obscure information so that a network node or an eavesdropper is not easily able to determine the information without secret information called a key. A cipher is an algorithm for performing encryption. A block cipher, such as the Advanced Encryption Standard (AES), is a symmetric key is cipher that encrypts a fixed-length block of data called a "plaintext block" using an encryption key to generate an encrypted "ciphertext block." The ciphertext block can be decrypted using the encryption key to recover the plaintext block.

When a data stream to be encrypted is longer than the block size, the block cipher uses a "mode of operation" to encrypt the data stream. In one mode of operation, called the electronic codebook (ECB) mode, the stream is divided into blocks, and each plaintext block is individually encrypted using the encryption key. In ECB mode, since identical plaintext blocks in different parts of the stream map to the same ciphertext block, some patterns in the original data stream may not be obscured.

In another mode of operation, called the cipher-block chaining (CBC) mode, the stream is divided into blocks, and each plaintext block is processed based on a previous ciphertext block (using an XOR operation) before being encrypted. In CBC mode, each ciphertext block is dependent all previous ciphertext blocks, which helps to obscure patterns in the original data stream.

The first ciphertext block is processed based on an "initialization vector" since it has no previous ciphertext blocks. The initialization vector used in a CBC mode block cipher, or in other types of ciphers, also provides a form of randomization. Using a different initialization vector for different data streams, makes it more difficult to obtain information about the original data stream or the encryption key from the encrypted stream. The initialization vector is used (along with the encryption key) to decrypt the corresponding encrypted stream, and (unlike the encryption key) can be transmitted over a network along with the corresponding encrypted stream without compromising security.

SUMMARY

In one aspect, in general, the invention features a method for communicating in a network. The method includes encapsulating content from a plurality of high level data units from a high level layer to generate a stream; dividing the stream into a plurality of segments; individually encrypting at least some of the segments, wherein an encrypted segment includes a plurality of encrypted blocks, and at least some of the encrypted blocks are encrypted based on at least one other encrypted block within the encrypted segment; and supplying low level data units to a physical layer that handles physical communication over the network, at least some of the low level data units each including a plurality of encrypted segments.

Implementations of this aspect of the invention may incorporate one or more of the following features.

Each segment is divided into a plurality of data blocks; each encrypted segment is associated with overhead information; each low level data unit is associated overhead information; and a first encrypted block within a first encrypted segment within a first low level data unit is formed from a first data block using an encryption key and either a second encrypted block within the first encrypted segment or an initialization vector derived at least in part from at least one of a portion of the overhead information associated with the first encrypted segment and a portion of the overhead information associated with the first low level data unit.

The initialization vector is derived at least in part from overhead information associated with at least some function for receiving the low level data unit other than encryption.

Supplying a low level data unit includes forming a sequence of physical layer blocks, each physical layer block including an encrypted segment and the overhead information associated with the encrypted segment.

The overhead information associated with the encrypted segment includes at least one of a header and an integrity check sequence.

The integrity check sequence comprises a cyclic redundancy check code computed based on the header and the encrypted segment.

The initialization vector is derived at least in part from both the portion of the overhead information associated with the first encrypted segment and the portion of the overhead information associated with the first low level data unit.

The method further includes selecting the portion of the overhead information associated with the first low level data unit based on which portions of said overhead information are likely to be different for different low level data units.

The portion of the overhead information associated with the low level data unit includes at least a portion of at least one of an identifier of a source and an identifier of a destination.

The method further includes selecting the portion of the overhead information associated with the first encrypted segment based on which portions of said overhead information are likely to be different for different segments.

The portion of the overhead information associated with the first encrypted segment includes at least a portion of one or more of the group consisting of: a sequence number associated with the first encrypted segment; information identifying a position of the first encrypted segment within the low level data unit; and information identifying a position of a boundary between high level data units within the segment from which the first encrypted segment was generated.

Each encrypted segment is capable of being independently retransmitted.

At least some segments are encoded using forward error correction.

The method further includes retransmitting a segment that has not been successfully received including re-encrypting the segment using a new initialization vector.

The method further includes selecting a length of the segments to reduce padding associated with at least some segments.

The selected length is a multiple of a cipher block size used for cipher block chaining mode encryption of a segment.

The length of the initialization vector is the same as the length of a cipher block size used for cipher block chaining mode encryption of a segment.

The high level layer comprises a medium access control layer.

In another aspect, in general, the invention features an apparatus for transmitting information over a network. The apparatus includes circuitry configured to couple a signal to a communication medium; and a network interface module coupled to the circuitry. The network interface module includes circuitry configured to encapsulate content from a plurality of high level data units from a high level layer to generate a stream; divide the stream into a plurality of segments; individually encrypt at least some of the segments, wherein an encrypted segment includes a plurality of encrypted blocks, and at least some of the encrypted blocks are encrypted based on at least one other encrypted block within the encrypted segment; and supply low level data units to a physical layer that handles physical communication over the network, at least some of the low level data units each including a plurality of encrypted segments.

Among the many advantages of the invention (some of which may be achieved only in some of its various aspects and implementations) are the following.

Higher communication efficiency can be achieved (e.g., in terms of payload to overhead ratio) by deriving an initialization vector for encrypting and decrypting a segment at least in part from overhead information associated with the segment or with the low level data unit that includes the segment. If the overhead information is associated with at least some function for receiving the low level data unit other than encryption, than no additional overhead is added due to the initialization vector.

After a receiving station receives overhead information for the low level data unit, the only other information needed to derive an initialization vector for a given encrypted segment is the overhead information associated with that segment. By independently encrypting segments including deriving an IV from the overhead information independently for each segment, then when an error that cannot be corrected is detected in a segment, only the portion of the low level data unit that includes that segment needs to be retransmitted in order to decode the segment.

Other features and advantages of the invention will be found in the detailed description, drawings, and claims.

DETAILED DESCRIPTION

There are a great many possible implementations of the invention, too many to describe herein. Some possible implementations that are presently preferred are described below. It cannot be emphasized too strongly, however, that these are descriptions of implementations of the invention, and not descriptions of the invention, which is not limited to the detailed implementations described in this section but is described in broader terms in the claims.

Figure 1:
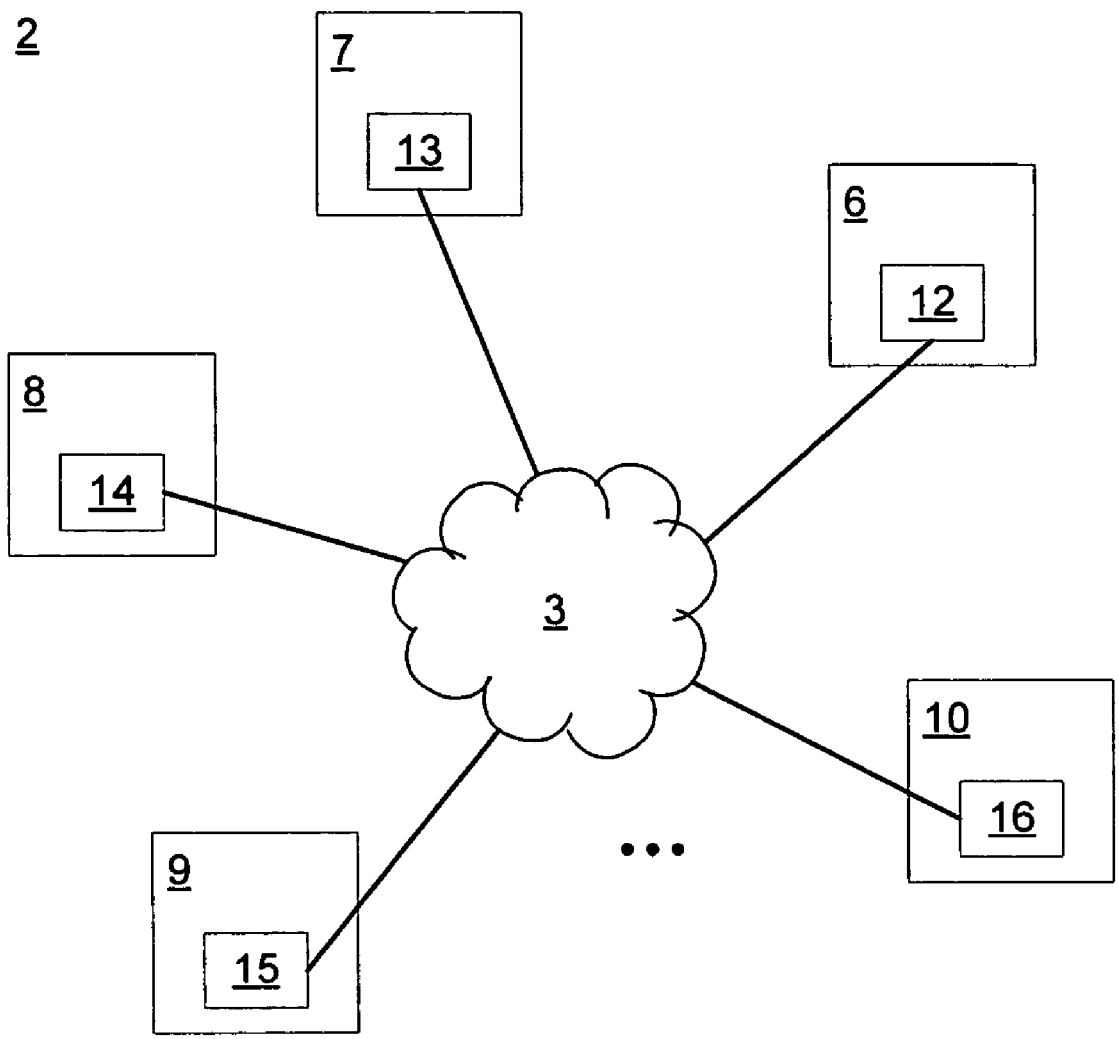
FIG. 1 is a diagram of a network configuration.

As shown in FIG. 1, a network configuration 2 includes a communication medium 3 for a number of communication stations 6-10 (e.g., computing devices, or audiovisual devices) to communicate with each other. The communication medium 3 can include one or more types of physical communication media such as coaxial cable, fiber optics, unshielded twisted pair, or power lines, for example. The network configuration 2 can also include devices such as bridges or repeaters. The communication medium 3 can connect the communication stations in the network configuration 2 according to any of a variety of network topologies (e.g., bus, tree, star, mesh).

The communication stations communicate with each other according to a predetermined network architecture. The abstract objects that make up the layers of a network architecture are sometimes called communication protocols. A communication protocol provides a communication service that higher-level objects (such as application processes, or higher-level layers) use to transmit and receive information. For example, in some network architectures the lowest-level layers include physical (PHY) layer and medium access control (MAC) layer communication protocols. The PHY layer convert data to and from a signal waveform that is transmitted over the communication medium 3. The MAC layer is a sub-layer of a data link layer and provides an interface to the PHY layer, for example, according to the Open Systems Interconnection (OSI) network architecture standard.

The communication stations 6-10 include respective network interface modules 12-16 that implement the communication protocols in hardware, software, or a combination of hardware and software on the respective stations. The stations can have differences in the specific communication protocols used, and are still able to communicate with each other if the protocols are compatible. The communication protocol of a transmitting station transmits data to a peer communication protocol of a receiving station in the form of data units. At each station, the data units are passed up and down the layers of communication protocols (or "protocol stack"). A communication protocol receives a Service Data Unit (SDU) from a higher layer protocol and encapsulates the SDU with Protocol Control Information (PCI) (e.g., as a header) to form a protocol data unit (PDU) to be provided to a lower layer as an SDU. Thus, each lower layer provides a service for the higher layer to ensure the encapsulated SDU is delivered to a peer protocol.

For example, the MAC layer protocol at a transmitting station sends a MAC Protocol Data Unit (MPDU) to the MAC layer protocol at a receiving station. The MPDU includes PCI and other overhead information (e.g., information in a header or trailing Cyclic Redundancy Check (CRC) code) associated with the MAC layer and higher layers SDUs along with an application layer payload. The MAC layer provides the MPDU to the PHY layer as a PHY Service Data Unit (PSDU) to be transported over the communication medium 3. A PHY Protocol Data Unit (PPDU) refers to the modulated signal waveform representing the PSDU that is transmitted over the communication medium 3.

Figure 2:
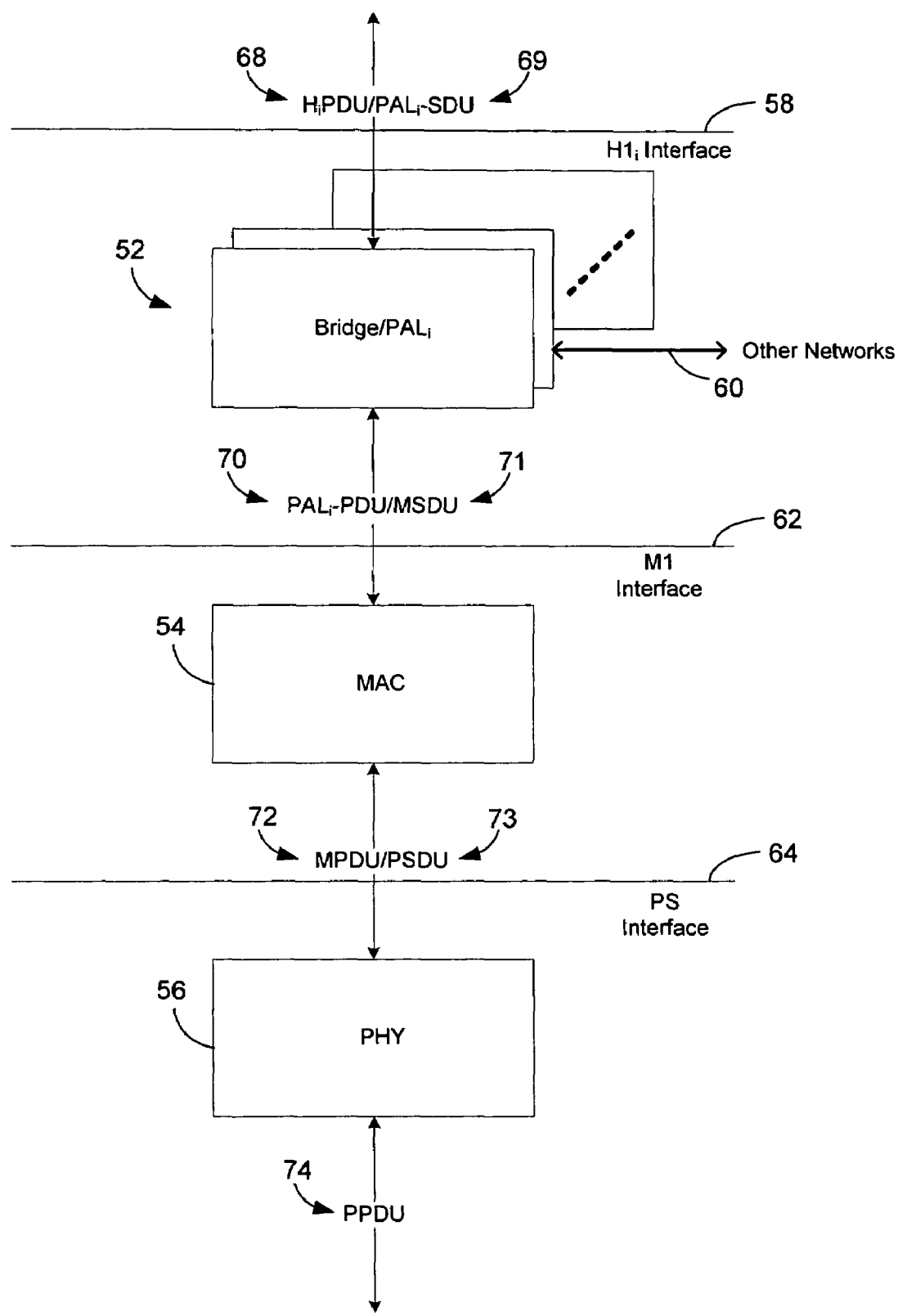
FIG. 2 is a diagram of a reference network architecture.

FIG. 2 shows exemplary system interfaces and their associated data units for a portion of a reference network architecture 50 that can be used by the network configuration 2. This portion may be implemented at each station. Three layers of the network architecture are shown: Protocol Adaptation Layer (PAL) including one or more layers Bridge/$PAL_i$ 52, MAC 54, and Physical layer (PHY) 56, separated by an M1 Interface 62 and a PS interface 64, respectively.

A higher-level interface $H1_i$ 58 denotes the $i^{th}$ Host Interface, with one interface for each protocol supported. The $H1_i$ interface 58 defines the point of demarcation for the $i^{th}$ Host Protocol Data Units ($H_iPDU$) 68 and the $i^{th}$ Protocol Adaptation Layer Service Data Unit (PAL$_i$SDU) 69 to higher layers of the network architecture 50.

For each protocol supported, the corresponding Bridge/PAL$_i$ 52 may be implemented partially in host software and partially in firmware and/or hardware. Examples of architecture 50 support IEEE 802.3 and Isochronous Stream protocols as well as provide access to proprietary protocols of other networks through interface 60. The Bridge/PAL$_i$ 52 provides support for Higher Layer Adaptation (HLA) functionality and/or Bridging functionality. Both HLA and Bridging operations support translation of host data packets including PAL Protocol Data Units (PAL$_i$PDU) 70 to MAC Service Data Units (MSDUs) 71 and vice versa, and translation of host address from the H1 interface 58 to addresses of the corresponding network interface 12-16 (e.g., MAC addresses). HLA and bridging operations also support determination of traffic classes and QoS parameters in addition to establishment of streams in coordination with the MAC layer.

The M1 interface 62 is common to all Protocol Adaptation Layers and defines the demarcation between a given Bridge/PAL$_i$ 52 and the MAC layer 54, with PAL Protocol Data Units (PAL$_i$PDUs) 70 being passed down from the Bridge/PAL$_i$ 52 to the MAC layer 54 as MAC Service Data Units (MSDUs) 71 and vice versa.

The Medium Access Control (MAC) layer 54 processes MAC Service Data Units (MSDUs) 71 from the Bridge/PAL$_i$ 52 and generates MAC Protocol Data Units (MPDUs) 72 for delivery to the Physical Layer 56 as PHY Service Data Units (PSDUs) 73. MAC layer 54 processing includes, for example, Service interface to PAL 52, Network Management, Admission Control, Encryption, Error Control (ARQ), Retransmission, Escalation, Framing, Segmentation & Reassembly, Packet Encapsulation and De-encapsulation, Channel Access (Contention Free Bursting, managed sessions, CSMA/CA, etc.), Time Stamping, Synchronization—with multimedia clocks, and Contention Free Sessions.

The Physical Layer Signaling (PS) Interface 64 separates the MAC layer 54 and the PHY 56 with MAC Protocol Data Units (MPDUs) 72 being passed to the PHY 56 from the MAC layer 54 as PHY Service Data Units (PSDUs) 73 across the PS Interface 64 and vice versa.

The Physical Layer (PHY) 56 Protocol provides various operations for transmitting a PHY Protocol Data Unit (PPDU) signal 74 that includes symbols on which the PSDU 73 data has been modulated according to a modulation scheme. For example, in an Orthogonal Frequency Division Multiplexing (OFDM) modulation scheme over a shared communication medium such as a power line medium, the PHY 56 can provide forward error correction (FEC) coding, encryption, physical carrier sensing, frame control decoding, error detection, and information needed for channel estimation and selection of a "tone map" of carrier frequencies to be used for OFDM communication.

Any of a variety of communication system architectures can be used to implement the portion of the network interface module that converts data to and from a signal waveform that is transmitted over the communication medium. In OFDM modulation, data are transmitted in the form of OFDM "symbols." Each symbol has a predetermined time duration or symbol time $T_s$. Each symbol is generated from a superposition of N sinusoidal carrier waveforms that are orthogonal to each other and form the OFDM carriers. Each carrier has a peak frequency $f_i$ and a phase $\Phi_i$ measured from the beginning of the symbol. For each of these mutually orthogonal carriers, a whole number of periods of the sinusoidal waveform is contained within the symbol time $T_s$. Equivalently, each carrier frequency is an integral multiple of a frequency interval $\Delta f=1/T_s$. The phases $\Phi_i$ and amplitudes $A_i$ of the carrier waveforms can be independently selected (according to an appropriate modulation scheme) without affecting the orthogonality of the resulting modulated waveforms. The carriers occupy a frequency range between frequencies $f_1$ and $f_N$ referred to as the OFDM bandwidth.

Figure 3:
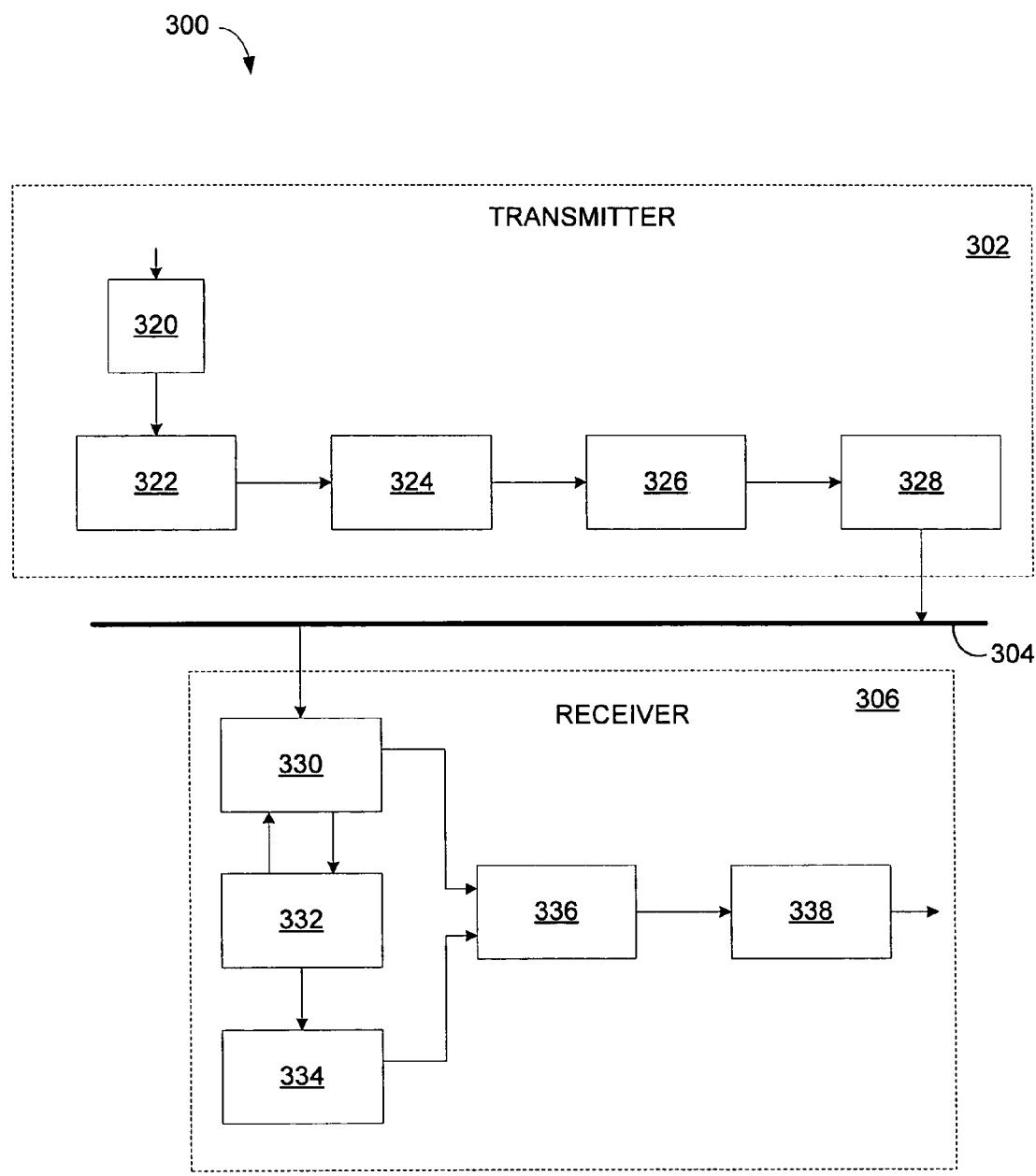
FIG. 3 is a block diagram of a communication system.

Referring to FIG. 3, a communication system 300 includes a transmitter 302 for transmitting a signal (e.g., a sequence of OFDM symbols) over a communication medium 304 to a receiver 306. The transmitter 302 and receiver 306 can both be incorporated into a network interface module at each station. The communication medium 304 can represent a path from one device to another over the power line network.

At the transmitter 302, modules implementing the PHY layer receive an MPDU from the MAC layer. The MPDU is sent to an encoder module 320 to perform processing such as scrambling, error correction coding and interleaving.

The encoded data is fed into a mapping module 322 that takes groups of data bits (e.g., 1, 2, 3, 4, 6, 8, or 10 bits), depending on the constellation used for the current symbol (e.g., a BPSK, QPSK, 8-QAM, 16-QAM constellation), and maps the data value represented by those bits onto the corresponding amplitudes of in-phase (I) and quadrature-phase (Q) components of a carrier waveform of the current symbol. This results in each data value being associated with a corresponding complex number $C_i=A_i \exp(j\Phi_i)$ whose real part corresponds to the I component and whose imaginary part corresponds to the Q component of a carrier with peak frequency $f_i$. Alternatively, any appropriate modulation scheme that associates data values to modulated carrier waveforms can be used.

The mapping module 322 also determines which of the carrier frequencies $f_1, \ldots, f_N$ within the OFDM bandwidth are used by the system 300 to transmit information. For example, some carriers that are experiencing fades can be avoided, and no information is transmitted on those carriers. Instead, the mapping module 322 uses coherent BPSK modulated with a binary value from the Pseudo Noise (PN) sequence for that carrier. For some carriers (e.g., a carrier i=10) that correspond to restricted bands (e.g., an amateur radio band) on a medium 304 that may radiate power no energy is transmitted on those carriers (e.g., $A_{10}=0$). The mapping module 322 also determines the type of modulation to be used on each of the carriers (or "tones") according to a "tone map." The tone map can be a default tone map, or a customized tone map determined by the receiving station.

An inverse discrete Fourier transform (IDFT) module 324 performs the modulation of the resulting set of N complex numbers (some of which may be zero for unused carriers) determined by the mapping module 322 onto N orthogonal carrier waveforms having peak frequencies $f_1, \ldots, f_N$. The modulated carriers are combined by IDFT module 324 to form a discrete time symbol waveform S(n) (for a sampling rate $f_R$), which can be written as $$S(n) = \sum_{i=1}^{N} A_i \exp[j(2\pi i n/N + \Phi_i)] \qquad \text{Eq. (1)}$$

where the time index n goes from 1 to N, Ai is the amplitude and $\Phi_i$ is the phase of the carrier with peak frequency $f_i=(i/N)f_R$, and $j=\sqrt{-1}$. In some implementations, the discrete Fourier transform corresponds to a fast Fourier transform (FFT) in which N is a power of 2.

A post-processing module 326 combines a sequence of consecutive (potentially overlapping) symbols into a "symbol set" that can be transmitted as a continuous block over the communication medium 304. The post-processing module 326 prepends a preamble to the symbol set that can be used for automatic gain control (AGC) and symbol timing synchronization. To mitigate intersymbol and intercarrier interference (e.g., due to imperfections in the system 300 and/or the communication medium 304) the post-processing module 326 can extend each symbol with a cyclic prefix that is a copy of the last part of the symbol. The post-processing module 326 can also perform other functions such as applying a pulse shaping window to subsets of symbols within the symbol set (e.g., using a raised cosine window or other type of pulse shaping window) and overlapping the symbol subsets.

An Analog Front End (AFE) module 328 couples an analog signal containing a continuous-time (e.g., low-pass filtered) version of the symbol set to the communication medium 304. The effect of the transmission of the continuous-time version of the waveform S(t) over the communication medium 304 can be represented by convolution with a function $g(\tau;t)$ representing an impulse response of transmission over the communication medium. The communication medium 304 may add noise n(t), which may be random noise and/or narrowband noise emitted by a jammer.

At the receiver 306, modules implementing the PHY layer receive a signal from the communication medium 304 and generate an MPDU for the MAC layer. An AFE module 330 operates in conjunction with an Automatic Gain Control (AGC) module 332 and a time synchronization module 334 to provide sampled signal data and timing information to a discrete Fourier transform (DFT) module 336.

After removing the cyclic prefix, the receiver 306 feeds the sampled discrete-time symbols into DFT module 336 to extract the sequence of N complex numbers representing the encoded data values (by performing an N-point DFT). Demodulator/Decoder module 338 maps the complex numbers onto the corresponding bit sequences and performs the appropriate decoding of the bits (including deinterleaving and descrambling).

Any of the modules of the communication system 300 including modules in the transmitter 302 or receiver 306 can be implemented in hardware, software, or a combination of hardware and software.

In some implementations, an MPDU can be generated from a stream of MSDUs such that there is not necessarily a one-to-one correspondence between an MSDU and an MPDU. For example, in a MAC Framing process, each of a series of MAC Frames (or "Sub-Frames") is generated from one or more MSDUs and multiple MAC Frames are concatenated into a MAC Frame Stream. The MAC Frame Stream is then segmented into segments (e.g., fixed-size segments) that can be included in an MPDU.

Figure 4:
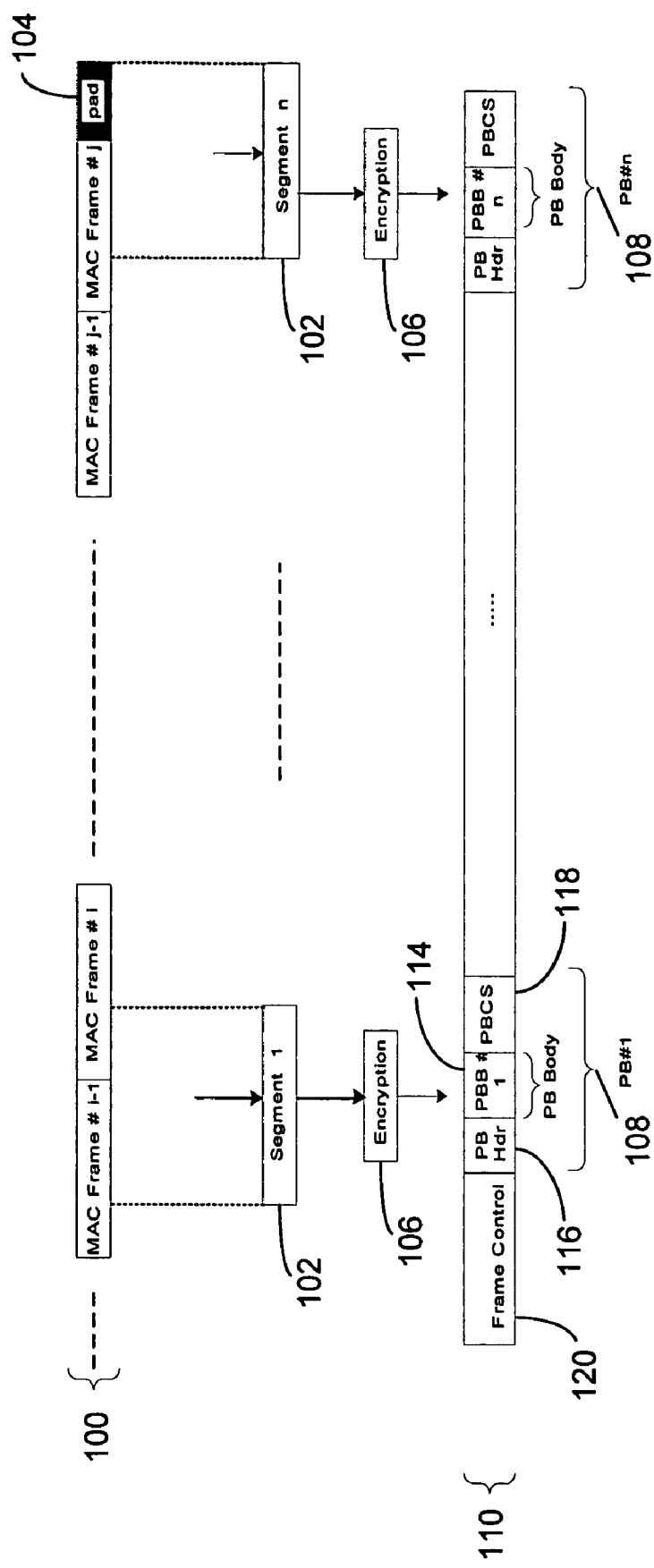
FIG. 4 is a format for a MPDU.

Referring to FIG. 4, a MAC Frame Stream 100 includes a continuous stream of MAC Frames of potentially varying length. A segment 102 is formed from a portion of the MAC Frame Stream 100. Depending on the relative sizes of the segment 102 and the MAC Frames, a segment can contain a fraction of a MAC Frame and/or multiple MAC Frames. Thus, a segment can include zero, one or more boundaries between MAC Frames. For each segment, the MAC layer tracks the offset of the first MAC Frame boundary within the segment. This boundary information is transmitted along with the segment and is used by the receiving station to demarcate the MAC Frames from the received segments. The first MAC Frame boundary in a segment is sufficient since other MAC Frame boundaries (if any) can be determined from information in previous MAC Frames (e.g., MAC Frame length information). The MAC Frame boundary information enables a receiving station to find the start of the next MAC Frame if the receiving station needs to discard segments from a previous MAC Frame and continue reception with the next MAC frame. Each segment is also associated with a segment sequence number (SSN). The SSN is initialized to zero for the first segment in a MAC Frame Stream and incremented by one when a new segment is formed. SSNs enable reception of out-of-order segments and duplicate detection at the receiving station.

The end of the MAC Frame Stream 100 may not contain enough data to fill a segment 102 completely at a time when the segments are to be encapsulated into an MPDU (submitted to the PHY layer as a PSDU). In such cases, the MAC Frame Stream 100 can be padded (e.g., zero padded) with a pad portion 104, so a complete segment 102 can be formed. Padding of MAC Frame Streams to form the last segment (e.g., "Segment n" in FIG. 3) can be delayed until just before the segment is to be processed for submission to the PHY layer to enable to allow time for the next MAC Frame to be added to the MAC Frame Stream 100. A predetermined data value can be included at the beginning of the pad portion 104 to indicate the presence of a pad in the remainder of the segment.

A segment 102 is treated as an entity targeted for reliable delivery services by the MAC and PHY layers. Each segment 102 can be individually encrypted such that each segment can be decrypted at the receiving station without needing any of the other segments. For example, a CBC mode block cipher (e.g., a 128-bit AES cipher in CBC mode) can be used by dividing the data from the MAC Frame Stream 100 into data blocks (or "plaintext blocks")of a given size (e.g., 128 bits which is 16 bytes). The size of a segment can be selected to be a multiple of the size of the data blocks to eliminate the need to pad the last data block of a segment. Thus, each encrypted segment 106 includes a predetermined number of encrypted blocks (or "ciphertext blocks").

The MAC layer sends each encrypted segment 106 within a PHY Block (PB) 108 of an MPDU 110. A PB body (PBB) field 114 of a PB 108 carries the encrypted segment 106 as payload of a PB 108. Other fields of the PB 108 carry overhead information (e.g., information that is used by the PHY layer for transmitting the encrypted segment 106). A PB Header 116, for example, includes fields for the SSN and the first MAC Frame Boundary offset (if any) associated with the segment. The PB Header 116 can also include information indicating other characteristics of a segment, such as a type of stream to which the segment belongs (e.g., a data stream or a management stream). A PB Check Sequence (PBCS) 118 is used to check the integrity of the PB 108 at the receiving station. The PBCS is, for example, CRC code calculated on the PBB 114 and PB Header 116.

Each segment 102 (and encrypted segment 106) corresponds to a different PB 108 (or "FEC Block")that can be independently retransmitted. Since FEC coding enables the PHY layer to detect errors on a PHY Block basis, segments 102 that have errors can be retransmitted without requiring retransmission of segments 102 that do not have errors.

The size of a segment 102 can be selected to provide a trade-off between high efficiency and low latency. For example, the segments can be large enough such that the overhead information (e.g., PB Header 116 and PBCS 118) associated with a segment 102 is small compared to the size of the segment 102 (e.g., small overhead to payload ratio). The segment can be small enough to isolate the effect of errors to a small span of data surrounding the error so that the latency for retransmitting information is low. A small segment can also decrease the potential size of the pad portion 104 of a final PB 108. An example of such a trade-off in a case with 16-byte data block, a 4-byte PB header 116, and 4-byte PBCS 118 is 512 bytes, which yields 520-byte PBs 108.

An MPDU 110 also includes an MPDU header 120 (or "Frame Control" section) preceding the sequence of PBs 108. The MPDU header 120 includes overhead information associated with transmission of the MPDU 110 and/or information relevant to all PBs 108 in the MPDU 110. The MPDU 110 is handed over to the PHY layer to be modulated onto a PPDU signal and transmitted to a receiving station. The information contained in the MPDU header 120 and PB Header 116 can be used by the receiving station for reassembly of the high layer data units, such as the stream to which a segment 102 belongs.

Another aspect of the process of encrypting the segments 102 to generate the encrypted segments 106 is selection of an initialization vector (IV) used to initialize the encryption process. For example, in a CBC mode cipher, a given encrypted block within an encrypted segment 106 is formed by combining (e.g., using an XOR operation) a corresponding data block within the segment 102 with either a preceding encrypted block or (for the first encrypted block that is formed) an IV associated with the segment 102. The combined block is then encrypted using an encryption key.

Both encryption key and IV should be known at the receiving station to properly decrypt an encrypted segment 106. A set of shared secret encryption keys can be known to both the sending and receiving stations (e.g., after being distributed according to a secure protocol), and a field in the MPDU header 120 (an "Encryption Key Select" (EKS) field) can designate which of the encryption keys is to be used for decrypting the encrypted segments 106 in the corresponding MPDU 110. The IV does not necessarily need to be kept as secret as the encryption key; however, using the same or highly predictable IV with the same encryption key may increase vulnerability to certain cryptographic attacks. The IV used for encryption of a given encrypted segment 106 can be sent along with the segment (e.g., in the PB Header 116); however, the added overhead (e.g., 16 bytes) may be significant compared to the size of the segment (e.g., 512 bytes), reducing efficiency.

One way to lower overhead for sending the IVs is to encrypt the entire MPDU payload (multiple PBs), or an entire MAC F rame, in a long chain using CBC mode encryption, which would only require a single IV. However, in this scenario if any portion of the chain is lost or corrupt, data from that point forward in the chain will be lost since the CBC mode encryption for later encrypted blocks is dependent on that lost portion.

Another way to lower overhead for sending the IVs is to send a new IV less often, and then and make IVs for other PBs dependent on those new IVs in a predetermined way (e.g., incremented and transformed according to a known hash function). However, in this scenario, if any of the new IVs are lost, data encrypted with IVs dependent on the lost IVs will be lost.

Another way to lower overhead for sending the IVs is to derive the IV from overhead information that is already associated with at least some function for receiving the MPDU 110 other than encryption, including overhead information associated with the segment 102 (e.g., PB Header 116) and/or overhead information associated with the MPDU 110 (e.g., MPDU header 120). In an exemplary implementation, the IV for an encrypted segment 106 in a given PBB field 114 is obtained by concatenating fields from the corresponding PB header 116, fields from the MPDU header 120, and a "segment count" that indicates the relative location of the segment 106 (and corresponding PB 108) in the MPDU 110. The segment count is a value that can be determined at the receiving station without needing to be sent or represented by any overhead information of the MPDU 110. The receiving station can simply increment the segment count for each segment received in an MPDU.

From multiple fields that could potentially be used to supply a portion of the IV, the fields that are more likely to vary from one MPDU 110 to the next, or from one PB 108 to the next, can be selected to provide an IV that is more unpredictable. Even if there is a chance that any one of the fields may remain the same, by selecting multiple fields (or portions of fields) that are likely to vary, there is a reduced chance that the entire IV will remain the same from one MPDU 110 or PB 108 to the next. In this example, since the segment count increments from one PB 108 to the next in a given MPDU 110, IVs for consecutive encrypted segments 106 will not be the same.

Examples of fields from the MPDU header 120 that can be selected for inclusion in the IV as being likely to be different for different MPDUs are: source address, destination address, link identifier, EKS, pending PBs, bit loading estimate, tone map index, MPDU count, and burst count. Using the source and destination address ensures that the IVs will be different for each pair of source/destination stations communicating; the IVs will also be different in each direction since the source becomes the destination and the destination becomes the source in the other direction. The link identifier identifies one of potentially multiple streams from a source to a destination. The EKS that is used by receiver to determine which encryption key to use may depend on various other factors such as a logical network to which the station belongs. The pending PBs represents a backlog of PBs to be sent in buffer and typically varies for different MPDUs. The bit loading estimate is based on a data rate associated with a given tone map. The tone map index changes when a different tone map is used. The MPDU count changes for consecutive MPDUs. The burst count counts down (e.g., 3, 2, 1, 0) for a burst of MPDUs to be sent. Additionally, the IV could include a check sequence for the MPDU header 120 that is computed as a function of all the other fields in the MPDU header, which would act as a hash value having high likelihood of changing when at least one of the other fields changes.

Examples of fields from the PB Header 116 that can be selected for inclusion in the IV as being likely to be different for different PBs are: SSN, MAC Frame boundary offset, and MAC Frame boundary flag. The SSN increments from one PB 108 to the next, as does the segment count, but the SSN does not necessarily wrap around to 0 (or 1 or some other starting value) at the start of the MPDU 110, as does the segment count. Since the SSN increments even across MPDU boundaries, the SSN does not repeat until rolling over at it's maximum value (e.g., $N_{max}$=65,535 for a 16-bit SSN). By the time the SSN repeats (after rolling over) there is a high likelihood that at least some of the bits in the varying fields have changed (e.g., the segment count is likely to be different since a segment is not likely to be in the same position within an MPDU as the last segment with the same SSN), or that a new encryption key is being used. Any two segments within $N_{max}$+1 of each other will not have the same IV.

The MAC Frame boundary flag indicates whether there is at least one boundary between two MAC frames within the PB. If there is at least one boundary, the MAC Frame boundary offset indicates where the first boundary occurs in the PB. These fields are likely to change if the sizes of MAC Frames vary or are not multiples of the segment size.

The combination of these fields used in the IV provides an IV that will have a low probability of repeating for a given encryption key, which can still provide acceptable level of protection from cryptographic attacks.

After the MPDU 110 is received at the receiving station, the PBCS 118 of each PB 108 is checked and the good PBs are decrypted. PBs 108 containing errors that cannot be corrected are reported to the transmitting station by an acknowledgement signal and are re-encrypted and retransmitted using the current encryption key and a new IV derived from new overhead information of the MPDU in which it is being sent.

Many other implementations of the invention other than those described above are within the invention, which is defined by the following claims.

What is claimed is:

1. A method for communicating in a network, the method comprising:
    encapsulating content from a plurality of high level data units from a high level layer to generate a stream;
    dividing the stream into a plurality of segments with each segment being divided into a plurality of data blocks and each segment being associated with segment overhead information;
    associating the plurality of segments with low level data units, at least some of the low level data units associated with a plurality of segments, each low level data unit being associated with data unit overhead information different from the segment overhead information associated with each segment that is associated with that low level data unit;
    individually encrypting at least some of the segments, wherein an encrypted segment includes a plurality of encrypted blocks, and a first encrypted block within a first encrypted segment within a first low level data unit is formed from a first data block using an encryption key and an initialization vector derived at least in part from a portion of the segment overhead information associated with the first encrypted segment and a portion of the data unit overhead information associated with the first low level data unit; and
    supplying the low level data units, including the encrypted segments, to a physical layer that handles physical communication over the network, at least some of the low level data units each including a plurality of encrypted segments.

2. The method of claim 1, further comprising
    a second encrypted block within a first encrypted segment within a first low level data unit is formed from a second data block using an encryption key and the first encrypted block within the first encrypted segment.

3. The method of claim 1, wherein the initialization vector is derived at least in part from data unit overhead information associated with at least some function for receiving the low level data unit other than encryption.

4. The method of claim 1, wherein supplying a low level data unit includes forming a sequence of physical layer blocks, each physical layer block including an encrypted segment and the segment overhead information associated with the encrypted segment.

5. The method of claim 4, wherein the segment overhead information used to derive the initialization vector includes at least one of a header and an integrity check sequence.

6. The method of claim 5, wherein the integrity check sequence comprises a cyclic redundancy check code computed based on the header and the encrypted segment.

7. The method of claim 2, further comprising selecting the portion of the data unit overhead information used to derive the initialization vector based on which portions of said overhead information are likely to be different for different low level data units.

8. The method of claim 7, wherein the portion of the data unit overhead information used to derive the initialization vector includes at least a portion of at least one of an identifier of a source and an identifier of a destination.

9. The method of claim 2, further comprising selecting the portion of the segment overhead information used to derive the initialization vector based on which portions of said overhead information are likely to be different for different segments.

10. The method of claim 9, wherein the portion of the segment overhead information used to derive the initialization vector includes at least a portion of one or more of the group consisting of:
    a sequence number associated with the first encrypted segment;
    information identifying a position of the first encrypted segment within the low level data unit; and
    information identifying a position of a boundary between high level data units within the segment from which the first encrypted segment was generated.

11. The method of claim 2, wherein each encrypted segment is capable of being independently retransmitted.

12. The method of claim 11, wherein at least some segments are encoded using forward error correction.

13. The method of claim 11, further comprising retransmitting a segment that has not been successfully received including re-encrypting the segment using a new initialization vector.

14. The method of claim 1, further comprising selecting a length of the segments to reduce padding associated with at least some segments.

15. The method of claim 14, wherein the selected length is a multiple of a cipher block size used for cipher block chaining mode encryption of a segment.

16. The method of claim 1, wherein the length of the initialization vector is the same as the length of a cipher block size used for cipher block chaining mode encryption of a segment.

17. The method of claim 1, wherein the high level layer comprises a medium access control layer.

18. An apparatus for transmitting information over a network, the apparatus comprising:
    circuitry configured to couple a signal to a communication medium; and
    a network interface module coupled to the circuitry, and including circuitry configured to encapsulate content from a plurality of high level data units from a high level layer to generate a stream;
        divide the stream into a plurality of segments with each segment being divided into a plurality of data blocks and each segment being associated with segment overhead information;
        associating the plurality of segments with low level data units, at least some of the low level data units associated with a plurality of segments, each low level data unit being associated with data unit overhead information different from the segment overhead information associated with each segment that is associated with that low level data unit;
        individually encrypt at least some of the segments, wherein an encrypted segment includes a plurality of encrypted blocks, and a first encrypted block within a first encrypted segment within a first low level data unit is formed from a first data block using an encryption key and an initialization vector derived at least in part from a portion of the segment overhead information associated with the first encrypted segment and a portion of the data unit overhead information associated with the first low level data unit; and supply low level data units, including the encrypted segments, to a physical layer that handles physical communication over the network, at least some of the low level data units each including a plurality of encrypted segments.

19. The method of claim 1, wherein the portion of the data unit overhead information associated with the first low level data unit is associated with at least some function for receiving the low level data unit other than encryption.

20. The method of claim 9, wherein the portion of the segment overhead information used to derive the initialization vector includes information identifying a position of a boundary between high level data units within the segment from which the first encrypted segment was generated.

21. The method of claim 1 wherein deriving the initialization vector includes a check sequence for the MAC protocol data unit header computed as a function of all the other fields in the MAC protocol data unit header.

* * * * *